United States Patent
Abrams

(10) Patent No.: US 11,113,307 B2
(45) Date of Patent: Sep. 7, 2021

(54) ENTITY IDENTIFIER SYNCHRONIZATION ACROSS DATA CENTERS

(71) Applicant: Oracle International Corporation, Redwood Shores, CA (US)

(72) Inventor: Matthew Abrams, Las Cruces, NM (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 365 days.

(21) Appl. No.: 15/934,810

(22) Filed: Mar. 23, 2018

(65) Prior Publication Data

US 2018/0329969 A1    Nov. 15, 2018

Related U.S. Application Data

(60) Provisional application No. 62/506,438, filed on May 15, 2017.

(51) Int. Cl.
*G06F 16/27*        (2019.01)
*G06F 16/951*       (2019.01)
*G06F 16/23*        (2019.01)

(52) U.S. Cl.
CPC .......... *G06F 16/27* (2019.01); *G06F 16/2358* (2019.01); *G06F 16/951* (2019.01)

(58) Field of Classification Search
None
See application file for complete search history.

(56) References Cited

U.S. PATENT DOCUMENTS

| 10,606,705 B1* | 3/2020 | Janakiraman | G06F 11/1451 |
| 2007/0100834 A1* | 5/2007 | Landry | G06F 16/27 |
| 2007/0255854 A1* | 11/2007 | Khosravy | H04L 67/322 709/248 |
| 2009/0259697 A1* | 10/2009 | Satou | G06F 16/27 |
| 2013/0117423 A1* | 5/2013 | Gupta | G06F 16/27 709/221 |
| 2013/0339299 A1* | 12/2013 | Muller | G06F 11/1453 707/640 |
| 2014/0172793 A1* | 6/2014 | Stritzel | G06F 16/1756 707/634 |
| 2016/0092537 A1* | 3/2016 | Vieira | G06F 16/27 707/634 |
| 2018/0124072 A1* | 5/2018 | Hamdi | G06F 11/3013 |

* cited by examiner

*Primary Examiner* — Tony Mahmoudi
*Assistant Examiner* — Umar Mian
(74) *Attorney, Agent, or Firm* — Kilpatrick Townsend & Stockton LLP

(57) ABSTRACT

The present disclosure relates to synchronizing entity identifiers across multiple data centers. In some embodiments, an entity identifier translation server may be deployed within a cloud-based distributed environment. The entity identifier translation server may receive data from multiple different data centers and detect changes/updates to entity identifiers within the data centers. In response to detected changes, the entity identifier translation server may identify one or more corresponding entity identifiers within the other data centers. For each of the corresponding entity identifiers within the other data centers, the entity identifier translation server may determine whether or not the corresponding entity identifier is to be synchronized with the newly-changed entity identifier in the first data center, and if so, may initiate synchronization processes.

20 Claims, 7 Drawing Sheets

ENTITY IDENTIFIER SYNCHRONIZATION ACROSS DATA CENTERS

CROSS-REFERENCES TO RELATED APPLICATIONS

This application claims the benefit of U.S. Provisional Patent Application No. 62/506,438, filed May 15, 2017, entitled "ENTITY IDENTIFIER SYNCHRONIZATION ACROSS DATA CENTERS", which is hereby incorporated by reference in its entirety for all purposes.

FIELD

The present disclosure generally relates to synchronization across multiple data centers. Specifically, techniques are provided for scheduling and prioritizing synchronizations.

BACKGROUND

Increasingly, various computing systems are distributed. One type of distributed computing system includes a data center, such as a cloud-based data storage solution. Such data centers may include storage devices separated both geographically and/or with respect to hardware or network infrastructures. Each data center may maintain an ID space configured to store entity identifiers, such as identifiers representing client devices, browsers, households, individual users, etc. Entity identifiers may be associated with various metadata stored within the data center, and also may be linked to other corresponding entity identifiers in other data stores. Synchronization of entity identifiers between data centers may become costly for large scale data systems having thousands or even millions of updates per second.

SUMMARY

Provided are methods, including computer-implemented methods, devices including storage devices, and computer-program products for scheduling and performing synchronizations across data centers.

Various techniques are described herein for synchronizing data across multiple data centers. Specifically, data synchronizations are prioritized, such that data updates of select types trigger more immediate synchronizations than data updates of other types. The updates can include generating a new data structure, generating a new link between entity identifiers, merging two or more data structures, or modifying an existing data structure. The new and/or modified data structure can include new or changed metadata. The updates can be prioritized based on assessing the data change in view of one or more prioritization protocols.

A prioritization protocol can prioritize data changes based on (for example) a quantity of data changed or added, a type of data changed or added, unchanged data (e.g., a tag) associated with a modified data structure, etc. As other examples, a prioritization determination can be based on whether and/or how many of other data centers have subscribed to receive synchronization updates that correspond to the data structure, how frequently the data structure is locally updated (e.g., as indicated based on a count within a time period, a time since a previous update, etc.), and/or how frequently the data structure is updated in response to a synchronization update (e.g., as indicated based on a count of synchronizations within a time period, a time since a previous synchronization was performed, etc.).

In some instances, a first stage of a prioritization includes determining whether any synchronization is to be performed in response to the update. If so, at a second stage of the prioritization, it can be determined whether to prioritize the synchronization. A prioritization of a synchronization can result in, for example, an immediate or near immediate synchronization, adding a synchronization task for the update to a queue in an advanced position (e.g., at a top position or at least above tasks not associated with a high priority), and/or performing the synchronization for the update in a non-batch mode.

For example, an update to a data structure may include identifying a new value for each of one or more fields (e.g., where either the new value replaced an old value or the field was not previously associated with the value in the data structure). Each new value can be assigned a point value (e.g., based on a priority of an associated field, a variability across a population of values for the field, a predefined fixed point value, etc.), and the point values can be summed to generate a score for the update. The score may be further adjusted based on (for example) a number of total fields having values, how frequently the data structure has been updated (e.g., a time since a previous local update and/or a synchronization-triggered update), a number of other data centers subscribed to receive updates for the data structure, etc. In some instances, a score above a predefined fixed threshold triggers an immediate or near-immediate synchronization across storage devices in relation to the data structure. Updates associated with scores below the predefined threshold may result in a synchronization at a later time (e.g., as part of a batch synchronization) or may not trigger a synchronization (e.g., if the score is below a same or different predefined threshold). In some instances, synchronization tasks are added to a queue, and the queue is dynamically sorted based on the associated scores.

Each data structure may be associated with a particular entity (e.g., browser, device, household, IP address, person, user or device identifier). The data structure may correspond to or include a profile. The data structure can include field values that correspond to one or more characteristics of the entity, actions associated with the entity (e.g., web site session characteristics, web site interaction characteristics, etc.). For example, an update can be triggered based on a new session associated with a particular user device. The update can identify a duration of the session, tags of webpages visited during the session, a search term entered during the session, an indication that the user purchased a product during the session, and one or more characteristics of the product.

According to some embodiments of the invention, a method is provided. The method comprises detecting a plurality of data changes. Each data change of the plurality of data changes occurred at a data center and corresponds to a modification to or addition of an data structure in the data center. The modified or added data structure is associated with an entity identifier and includes metadata representing an existence of or characteristic of one or more previous communications transmitted from a computer system associated with the entity identifier. The method further comprises assessing, for each data change of the plurality of data changes, a type of data added or changed as a result of the data change. The method further comprises identifying, based on the assessments, an incomplete subset of the plurality of data changes as having had a material change. The method further comprises, for each data change in the incomplete subset of the plurality of data changes, identifying at least one other data center from a set of data centers that is subscribed to receive synchronization updates corresponding to the entity identifier, and transmitting, to each of the at least one other data center, a communication representing the data change to facilitate synchronizing the modified or added data structure stored at the data center with a corresponding data structure stored at the other data center.

According to some embodiments of the invention, a device is provided. The device comprises one or more processors. The device further comprises a non-transitory computer-readable medium containing instructions that, when executed by the one or more processors, cause the one or more processors to perform some or all of one or more methods described herein.

According to some embodiments of the invention, a computer-program product is provided. The computer-program product is tangibly embodied in a non-transitory machine-readable storage medium of a device. The computer-program product includes instructions that, when executed by one or more processors, cause the one or more processors to perform some or all of one or more methods described herein.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1A:
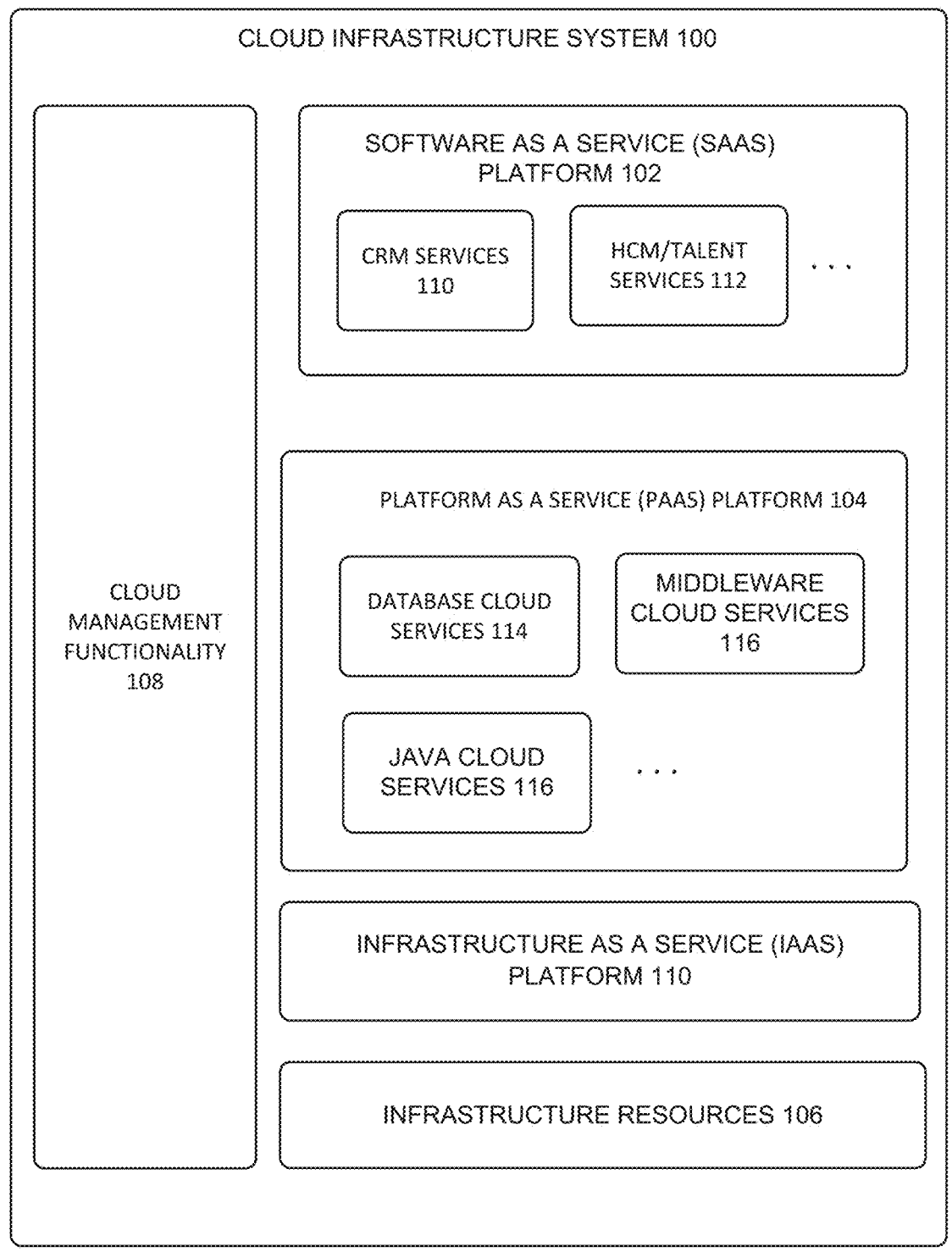
FIG. 1A is a block diagram illustrating a cloud infrastructure system, in accordance with some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Many types of computing systems and applications generate vast amounts of data pertaining or resulting from operation of that computing system or application. In some instances, data centers process various data (e.g., log files, data streams, content requests, html requests, etc. to identify one of indices by which to index the data. For example, an entity identifier can be identified (e.g., based on communication metadata that identifies a source device, client device, username, etc.). A data structure or record can then be generated to correspond to the entity identifier and can include other data (e.g., values for various fields) identified based on the collected data. The data structure can be updated as the data center receives additional data that corresponds to the entity identifier.

However, in some instances, a distributed data infrastructure can enhance the data collection. Specifically, individual data centers may have access to different incoming communications and/or data sources. For example, individual data centers may correspond to different application, middleware and/or database service offerings, each of which may be configured to facilitate different types of communications and/or interaction information. Thus, each data center can be positioned to update various data structure differently.

The distributed data infrastructure can include a cloud infrastructure system, such as the Oracle Public Cloud or Oracle Data Cloud. A cloud infrastructure system may provide many capabilities including, but not limited to, provisioning, managing and tracking a user's subscription for services and resources in the cloud infrastructure system, providing predictable operating expenses to users utilizing the services in the cloud infrastructure system, providing robust identity domain separation and protection of a user's data in the cloud infrastructure system, providing users with a transparent architecture and control of the design of the cloud infrastructure system, providing users assured data protection and compliance with data privacy standards and regulations, providing users with an integrated development experience for building and deploying services in the cloud infrastructure system and providing users with a seamless integration between business software, middleware, database and infrastructure services in the cloud infrastructure system.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services and the like. Services provided by the cloud infrastructure system can dynamically scale to meet the needs of its users. A specific instantiation of a service provided by cloud infrastructure system is referred to herein as a service instance. In general, any service made available to a user via a communication network such as the Internet from a cloud service provider's system is referred to as a cloud service. Typically, in a public cloud environment, servers and systems that make up the cloud service provider's system are different from the user's own on-premises servers and systems. For example, a cloud service provider's system may host an application and a user may, via a communication network such as the Internet, on demand, order and use the application.

A service in a computer network cloud infrastructure can include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and script-language middleware engine for private use by a networked developer. As another example, a service can include access to an email software application hosted on a cloud vendor's web site.

FIG. 1A is a logical view of a cloud infrastructure system according to some embodiments. Cloud infrastructure system 100 may provide a variety of services via a cloud or networked environment. These services may include one or more services provided under Software as a Service (SaaS) category, Platform as a Service (PaaS) category, Infrastructure as a Service (IaaS) category, or other categories of services including hybrid services. A user, via a subscription order, may order one or more services provided by cloud infrastructure system 100. Cloud infrastructure system 100 then performs processing to provide the services in the user's subscription order.

Cloud infrastructure system 100 may provide the cloud services via different deployment models. For example, services may be provided under a public cloud model where cloud infrastructure system 100 is owned by an organization selling cloud services (e.g., owned by Oracle) and the services are made available to the general public or different industry entities. As another example, services may be provided under a private cloud model where cloud infrastructure system 100 is operated solely for a single organization and may provide services for one or more entities within the organization. The cloud services may also be provided under a community cloud model where cloud infrastructure system 100 and the services provided by system 100 are shared by several organizations in a related community. The cloud services may also be provided under a hybrid cloud model, which is a combination of two or more different models.

As shown in FIG. 1A, cloud infrastructure system 100 may comprise multiple components, which working in conjunction, enable provision of services provided by cloud infrastructure system 100. In the embodiment illustrated in FIG. 1A, cloud infrastructure system 100 includes a SaaS platform 102, a PaaS platform 104, an IaaS platform 110, infrastructure resources 106, and cloud management functionality 108. These components may be implemented in hardware, or software, or combinations thereof.

SaaS platform 102 may be configured to provide cloud services that fall under the SaaS category. For example, SaaS platform 102 may provide capabilities to build and deliver a suite of on-demand applications on an integrated development and deployment platform. SaaS platform 102 may manage and control the underlying software and infrastructure for providing the SaaS services. By utilizing the services provided by SaaS platform 102, users can utilize applications executing on cloud infrastructure system 100. Users can acquire the application services without the need for users to purchase separate licenses and support.

Various different SaaS services may be provided. Examples include, without limitation, services that provide solutions for sales performance management, enterprise integration and business flexibility for large organizations, and the like. In one embodiment, the SaaS services may include Customer Relationship Management (CRM) services 111 (e.g., Fusion CRM services provided by the Oracle cloud), Human Capital Management (HCM)/Talent Management services 112, and the like. CRM services 111 may include services directed to reporting and management of a sales activity cycle to a user, and others. HCM/Talent services 112 may include services directed to providing global workforce lifecycle management and talent management services to a user.

Various different PaaS services may be provided by PaaS platform 104 in a standardized, shared and elastically scalable application development and deployment platform. Examples of PaaS services may include, without limitation, services that enable organizations (such as Oracle) to consolidate existing applications on a shared, common architecture, as well as the ability to build new applications that leverage the shared services provided by the platform. PaaS platform 104 may manage and control the underlying software and infrastructure for providing the PaaS services. Users can acquire the PaaS services provided by cloud infrastructure system 100 without the need for users to purchase separate licenses and support. Examples of PaaS services include without limitation Oracle Java Cloud Service (JCS), Oracle Database Cloud Service (DBCS), and others.

By utilizing the services provided by PaaS platform 104, users can utilize programming languages and tools supported by cloud infrastructure system 100 and also control the deployed services. In some embodiments, PaaS services provided by the cloud infrastructure system 100 may include database cloud services 114, middleware cloud services (e.g., Oracle Fusion Middleware services) 116 and Java cloud services 117. In one embodiment, database cloud services 114 may support shared service deployment models that enable organizations to pool database resources and offer users a database-as-a-service in the form of a database cloud, middleware cloud services 116 provides a platform for customers to develop and deploy various business applications and Java cloud services 117 provides a platform for users to deploy Java applications, in the cloud infrastructure system 100. The components in SaaS platform 102 and PaaS platform 104 illustrated in FIG. 1A are meant for illustrative purposes only and are not intended to limit the scope of the disclosed embodiments. In alternate embodiments, SaaS platform 102 and PaaS platform 104 may include additional components for providing additional services to the users of cloud infrastructure system 100.

Various different IaaS services may be provided by IaaS platform 110. The IaaS services facilitate the management and control of the underlying computer resources such as storage, networks, and other fundamental computer resources for users utilizing services provided by the SaaS platform and the PaaS platform.

In certain embodiments, cloud infrastructure system 100 includes infrastructure resources 106 for providing the resources used to provide various services to users of the cloud infrastructure system 100. In one embodiment, infrastructure resources 106 includes pre-integrated and optimized combinations of hardware such as servers, storage and networking resources to execute the services provided by the PaaS platform and the SaaS platform.

In certain embodiments, cloud management functionality 108 provides comprehensive management of cloud services (e.g., SaaS, PaaS, IaaS services) in the cloud infrastructure system 100. In one embodiment, cloud management functionality 108 includes capabilities for provisioning, managing and tracking a user's subscription received by the cloud infrastructure system 100, and the like.

Figure 1B:
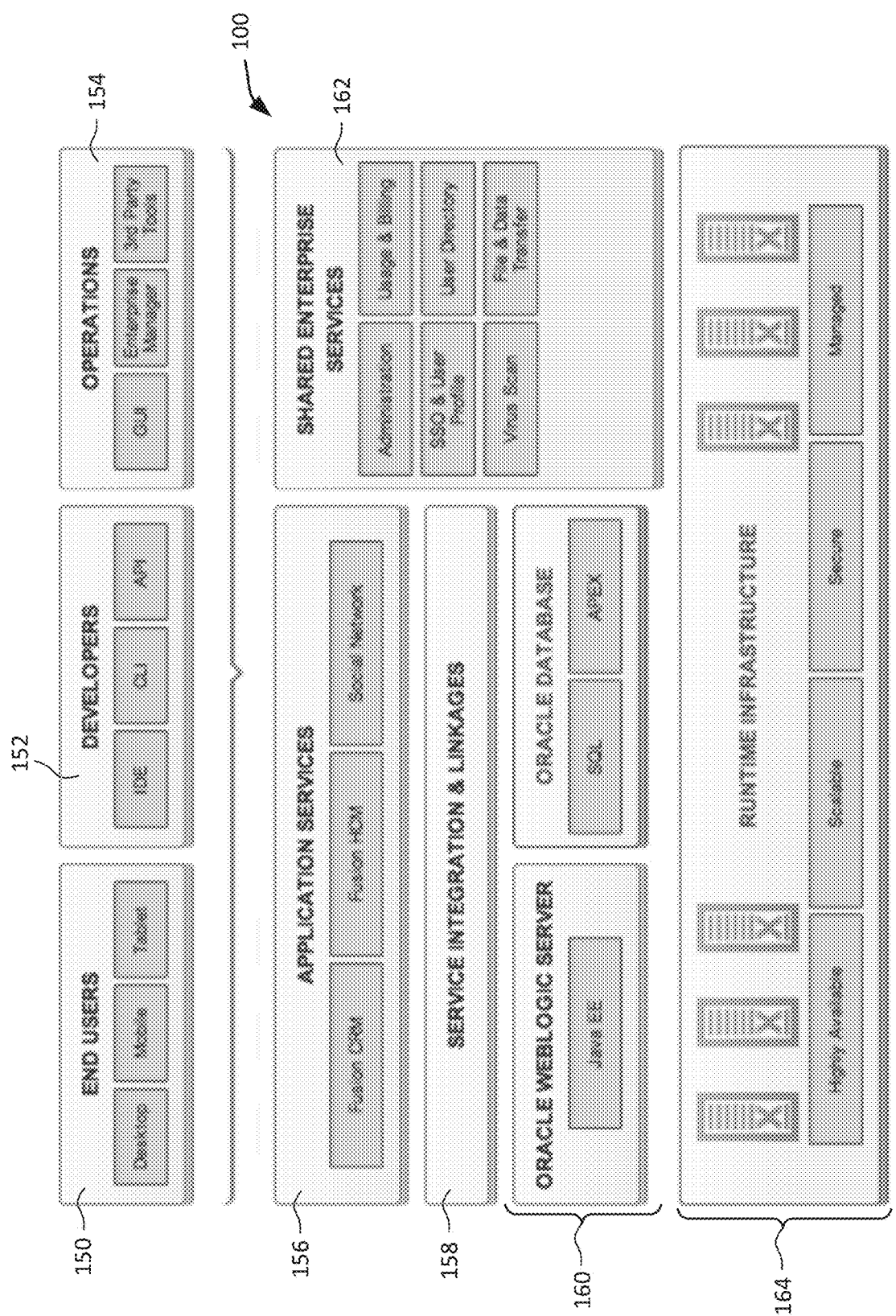
FIG. 1B is a simplified module diagram of a hardware/software stack that may be used to implement a cloud infrastructure system, in accordance with some embodiments.

FIG. 1B is a simplified module diagram of a hardware/software stack that may be used to implement cloud infrastructure system 100 according to some embodiments. It will be appreciated that implementation depicted in FIG. 1B may have other components than those depicted in FIG. 1B. Further, the embodiment shown in FIG. 1B is only one example of a cloud infrastructure system that may incorporate some embodiments. In some other embodiments, cloud infrastructure system 100 may have more or fewer components than shown in FIG. 1B, may combine two or more components, or may have a different configuration or arrangement of components. In certain embodiments, the hardware and software components are stacked so as to provide vertical integration that provides optimal performance.

Various types of users may interact with cloud infrastructure system 100. These users may include, for example, end users 150 that can interact with cloud infrastructure system 100 using various client devices such as desktops, mobile devices, tablets, and the like. The users may also include developers/programmers 152 who may interact with cloud infrastructure system 100 using command line interfaces (CLIs), application programming interfaces (APIs), through various integrated development environments (IDEs), and via other applications. User may also include operations personnel 154. These may include personnel of the cloud service provider or personnel of other users.

Application services layer 156 identifies various cloud services that may be offered by cloud infrastructure system 100. These services may be mapped to or associated with respective software components 160 (e.g., Oracle WebLogic server for providing Java services, oracle database for providing database services, and the like) via a service integration and linkages layer 158.

In certain embodiments, a number of internal services 162 may be provided that are shared by different components or modules of cloud infrastructure system 100 and by the services provided by cloud infrastructure system 100. These internal shared services may include, without limitation, a security and identity service, an integration service, a repository service, a data manager service, a virus scanning and white list service, a high availability, backup and recovery service, service for enabling cloud support in IDEs, an email service, a notification service, a file transfer service, and the like.

Runtime infrastructure layer 164 represents the hardware layer on which the various other layers and components are built. In some embodiments, runtime infrastructure layer 164 may comprise Oracle's Exadata machines for providing storage, processing, and networking resources. An Exadata machine may be composed of various database servers, storage servers, networking resources, and other components for hosting cloud-services related software layers. In certain embodiments, the Exadata machines may be designed to work with Oracle Exalogic, which is an engineered system providing an assemblage of storage, computing, network, and software resources. The combination of Exadata and Exalogic provides a complete hardware and software engineered solution that delivers high-performance, highly available, scalable, secure, and a managed platform for providing cloud services.

In some embodiments, the cloud services described above may be offered as services via a cloud environment.

Figure 2:
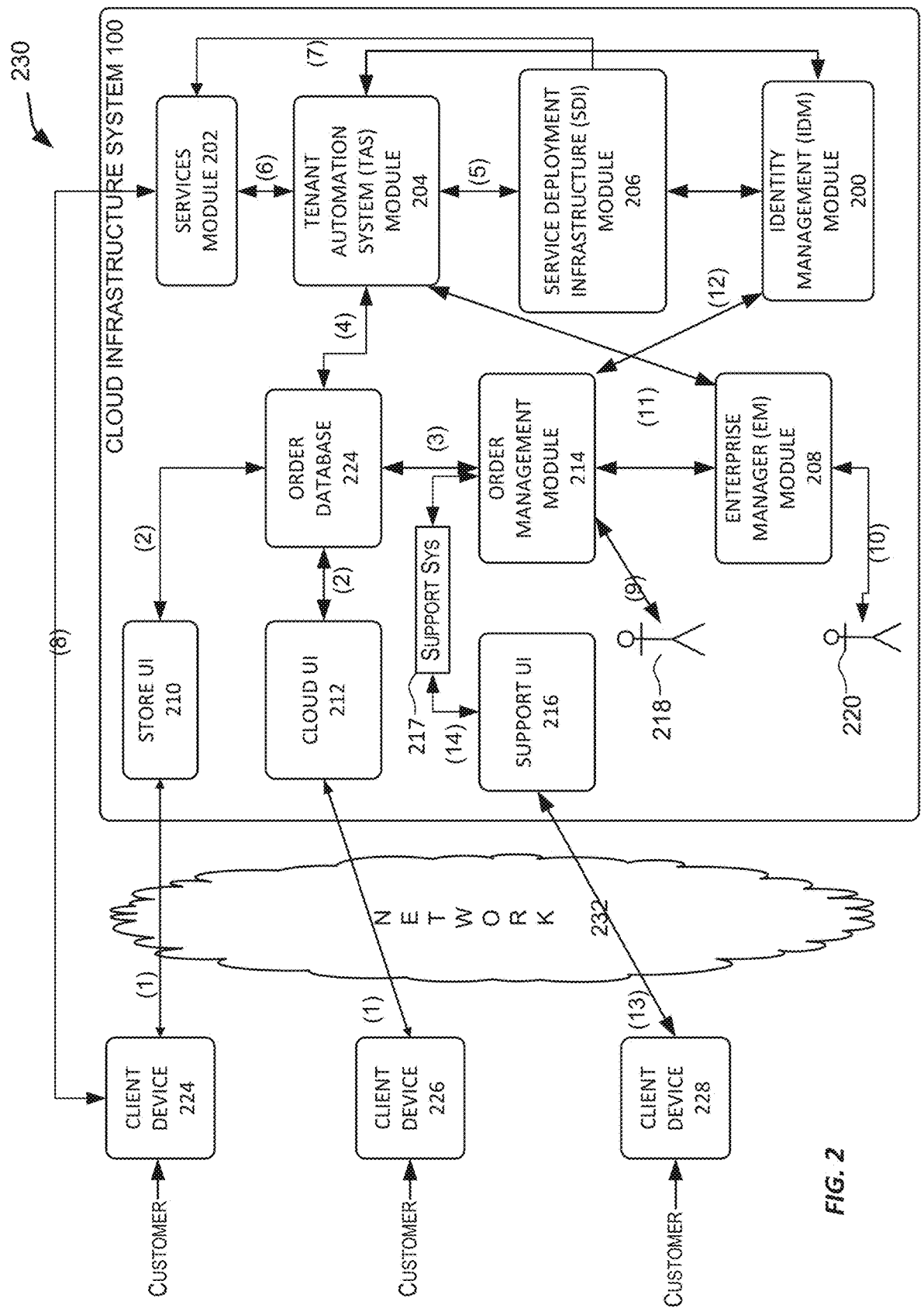
FIG. 2 is a block diagram of a system environment for implementing a cloud infrastructure system, in accordance with some embodiments.

FIG. 2 is a simplified block diagram of a system environment for implementing the cloud infrastructure system shown in FIG. 1, according to some embodiments. In the illustrated embodiment, system environment 230 includes one or more client computer devices 224, 226 and 228 that may be used by users to interact with cloud infrastructure system 100. A client device may be configured to operate a client application such as a web browser, a proprietary client application (e.g., Oracle Forms), or some other application, which may be used by a user of the client device to interact with cloud infrastructure system 100 to utilize services provided by cloud infrastructure system 100.

It will be appreciated that cloud infrastructure system 100 depicted in FIG. 2 may have other components than those depicted in FIG. 2. Further, the embodiment shown in FIG. 2 is only one example of a cloud infrastructure system that may incorporate an embodiment of the invention. In some other embodiments, cloud infrastructure system 100 may have more or fewer components than shown in FIG. 2, may combine two or more components, or may have a different configuration or arrangement of components.

Client computer devices 224, 226 and 228 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), workstation computers running any of a variety of commercially-available UNIX or UNIX-like operating systems (including without limitation the variety of GNU/Linux operating systems), or any other computer device. For example, client computer devices 224, 226 and 228 may be any other electronic device, such as a thin-client computer, Internet-enabled gaming system, and/or personal messaging device, capable of communicating over a network (e.g., network 232 described below). Although exemplary system environment 230 is shown with three client computer devices, any number of client computer devices may be supported. Other devices such as devices with sensors, etc. may interact with cloud infrastructure system 100.

A network 232 may facilitate communications and exchange of data between client computer devices 224, 226 and 228 and cloud infrastructure system 100. Network 232 may be any type of network familiar to those skilled in the art that can support data communications using any of a variety of commercially-available protocols, including without limitation TCP/IP, SNA, IPX, AppleTalk, and the like. Merely by way of example, network 232 can be a local area network (LAN) such as an Ethernet network, a Token-Ring network and/or the like, a wide-area network, a virtual network, including without limitation a virtual private network (VPN), the Internet, an intranet, an extranet, a public switched telephone network (PSTN), an infra-red network, a wireless network (e.g., a network operating under any of the IEEE 802.1X suite of protocols, the Bluetooth protocol known in the art, and/or any other wireless protocol), and/or any combination of these and/or other networks.

Cloud infrastructure system 100 may comprise one or more computers and/or servers which may be general purpose computers, specialized server computers (including, by way of example, PC servers, UNIX servers, mid-range servers, mainframe computers, rack-mounted servers, etc.), server farms, server clusters, or any other appropriate arrangement and/or combination. The computer devices that make up cloud infrastructure system 100 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

In various embodiments, cloud infrastructure system 100 may be adapted to automatically provision, manage and track a user's subscription to services offered by cloud infrastructure system 100. In some embodiments, as depicted in FIG. 2, the components in cloud infrastructure system 100 include an Identity Management (IDM) module 200, a services module 202, a Tenant Automation System (TAS) module 204, a Service Deployment Infrastructure (SDI) module 206, an Enterprise Manager (EM) module 208, one or more front-end web interfaces such as a store user interface (UI) 210, a cloud user interface (UI) 212, and a support user interface (UI) 216, an order management module 214, personnel 218, operator personnel 220 and an order database 225. These modules may include or be provided using one or more computers and/or servers which may include, e.g., specialized server computers, server farms, server clusters, or any other appropriate arrangement and/or combination. In one embodiment, one or more of these modules can be provided by cloud management functionality 108 or IaaS platform 110 in cloud infrastructure system 100. The various modules of the cloud infrastructure system 100 depicted in FIG. 2 are meant for illustrative purposes only and are not intended to limit the scope of embodiments of the present invention. Alternative embodiments may include more or fewer modules than those shown in FIG. 2.

In an exemplary operation, at (1) a user using a client device such as client device 224 or 226 may interact with cloud infrastructure system 100 by browsing the various services provided by cloud infrastructure system 100 and placing an order for a subscription for one or more services offered by cloud infrastructure system 100. In certain embodiments, the user may access store UI 210 or cloud UI 212 and place a subscription order via these user interfaces.

The order information received by cloud infrastructure system 100 in response to the user placing an order may include information identifying the user and one or more services offered by the cloud infrastructure system 100 that the user intends to subscribe to. A single order may include orders for multiple services. For instance, a user may login to cloud UI 212 and request a subscription for a CRM service and a Java cloud service in the same order.

Additionally, the order may also include one or more service levels for the ordered services. As used herein, and as will be discussed in greater detail below, a service level for a service determines the amount of resources to be allocated for providing the requested service in the context of the subscription, such as the amount of storage, amount of computer resources, data transfer facilities, and the like. For example, a basic service level may provide a minimum level of storage, data transmission, or number of users, and higher service levels may include additional resources.

In addition, in some instances, the order information received by cloud infrastructure system 100 may include information indicative of a user level, and the time period during which the service is desired. The user level specifies the priority of the user making the subscription request. In one example, the priority may be determined based on the quality of service that the cloud infrastructure system 100 guarantees or promises the user as specified by a Service Level Agreement (SLA) agreed to between the user and the provider of the cloud services. In one example, the different user levels include a basic level, a silver level and a gold level. The time period for a service may specify the start date and time for the service and the time period for which the service is desired (e.g., a service end date and time may be specified).

In one embodiment, a user may request a new subscription via store UI 210 or request for a trial subscription via cloud UI 212. In certain embodiments, store UI 210 may represent the service provider's eCommerce store front (e.g., www.oracle.com/store for Oracle Cloud services). Cloud UI 212 may represent a business interface for the service provider. A user can explore available services and sign up for interested services through cloud UI 212. Cloud UI 212 captures user input necessary for ordering trial subscriptions provided by cloud infrastructure system 100. Cloud UI 212 may also be used to view account features and configure the runtime environment located within cloud infrastructure system 100. In addition to placing an order for a new subscription, store UI 210 may also enable the user to perform other subscription-related tasks such as changing the service level of a subscription, extending the term of the subscription, increasing the service level of a subscription, terminating an existing subscription, and the like.

After an order has been placed per (1), at (2), the order information that is received via either store UI 210 or cloud UI 212 is stored in order database 225, which can be one of several databases operated by cloud infrastructure system 100 and utilized in conjunction with other system elements. While order database 225 is shown logically as a single database in FIG. 2, in actual implementation, this may comprise one or more databases.

At (3), the order is forwarded to order management module 214. Order management module 214 is configured to perform billing and accounting operations related to the order such as verifying the order and upon verification, booking the order, etc. In certain embodiments, order management module 214 may include a contract management module and an install base module. The contract management module may store contract information associated with the user's subscription order such as the user's service level agreement (SLA) with cloud infrastructure system 100. The install base module may include detailed descriptions of the services in the user's subscription order. In addition to order information, the install base module may track installation details related to the services, product status and support service history related to the services. As a user orders new services or upgrades existing ones, the install base module may automatically add new order information.

At (4), information regarding the order is communicated to TAS module 204. In one embodiment, TAS module 204 utilizes the order information to orchestrate the provisioning of services and resources for the order placed by the user. At (5), TAS module 204 orchestrates the provisioning of resources to support the subscribed services using the services of SDI module 206. At (6) TAS module 204 provides information related to the provisioned order received from SDI module 206 to services module 202. In some embodiments, at (7), SDI module 206 may also use services provided by services module 202 to allocate and configure the resources needed to fulfill the user's subscription order.

At (8), services module 202 sends a notification to the users on client computer devices 224, 226 and 228 regarding the status of the order.

In certain embodiments, TAS module 204 operates as an orchestration component that manages business processes associated with each order and applies business logic to determine whether an order is to proceed to provisioning. In one embodiment, upon receiving an order for a new subscription, TAS module 204 sends a request to SDI module 206 to allocate resources and configure those resources needed to fulfill the subscription order. SDI module 206 enables the allocation of resources for the services ordered by the customer. SDI module 206 provides a level of abstraction between the cloud services provided by cloud infrastructure system 100 and the physical implementation layer that is used to provision the resources for providing the requested services. TAS module 204 may thus be isolated from implementation details such as whether or not services and resources are actually provisioned on the fly or pre-provisioned and only allocated/assigned upon request.

In certain embodiments, a user may use store UI 210 to directly interact with order management module 214 to perform billing and accounting related operations such as verifying the order and upon verification, booking the order. In some embodiments, instead of a user placing an order, at (9), the order may instead be placed by personnel 218 on behalf of the user such as a user's service representative or sales representative. Personnel 218 may directly interact with order management module 214 via a user interface (not shown in FIG. 2) provided by order management module 214 for placing orders or for providing quotes for the user. This, for example, may be done for large groups of users where the order may be placed by the user representative through order management module 214. The representative may set up the subscription on behalf of the user.

EM module 208 is configured to monitor activities related to managing and tracking a user's subscription in cloud infrastructure system 100. EM module 208 collects usage statistics for the services in the subscription order such as the amount of storage used, the amount data transferred, the number of users, and the amount of system up time and system down time. At (10), a host operator personnel 220, who may be an employee of a provider of cloud infrastructure system 100, may interact with EM module 208 via a user interface (not shown in FIG. 2) to manage systems and resources on which services are provisioned within cloud infrastructure system 100.

Identity management (IDM) module 200 is configured to provide identity services such as access management and authorization services in cloud infrastructure system 100. In some embodiments, IDM module 200 controls information about users who wish to utilize the services provided by cloud infrastructure system 100. Such information can include information that authenticates the identities of such users and information that describes which actions those users are authorized to perform relative to various system resources (e.g., files, directories, applications, communication ports, memory segments, etc.). IDM module 200 can also include the management of descriptive information about each user and about how and by whom that descriptive information can be accessed and modified.

In some embodiments, information managed by the identity management module 200 can be partitioned to create separate identity domains. Information belonging to a particular identity domain can be isolated from all other identity domains. Also, an identity domain can be shared by multiple separate tenants. Each such tenant can be a user subscribing to services in the cloud infrastructure system 100. In some embodiments, a user can have one or many identity domains, and each identity domain may be associated with one or more subscriptions, each subscription having one or many services. For example, a single user can represent a large entity and identity domains may be created for divisions/departments within this large entity. EM module 208 and IDM module 200 may in turn interact with order management module 214 at (11) and (12) respectively to manage and track the user's subscriptions in cloud infrastructure system 100.

In some embodiments, at (13), support services may also be provided to the user via a support UI 216. In one embodiment, support UI 216 enables support personnel to interact with order management module 214 via a support backend system to perform support services at (14). Support personnel in the cloud infrastructure system 100 as well as users can submit bug reports and check the status of these reports via support UI 216.

Other interfaces, not shown in FIG. 2, may also be provided by cloud infrastructure system 100. For example, an identity domain administrator may use a user interface to IDM module 200 to configure domain and user identities. In addition, users may log into a separate interface for each service they wish to utilize. In certain embodiments, a user who wishes to subscribe to one or more services offered by cloud infrastructure system 100 may also be assigned various roles and responsibilities. In one embodiment, the different roles and responsibilities that may be assigned for a user may include that of a buyer, an account administrator, a service administrator, an identity domain administrator or a user who utilizes the services and resources offered by cloud infrastructure system 100.

Figure 3:
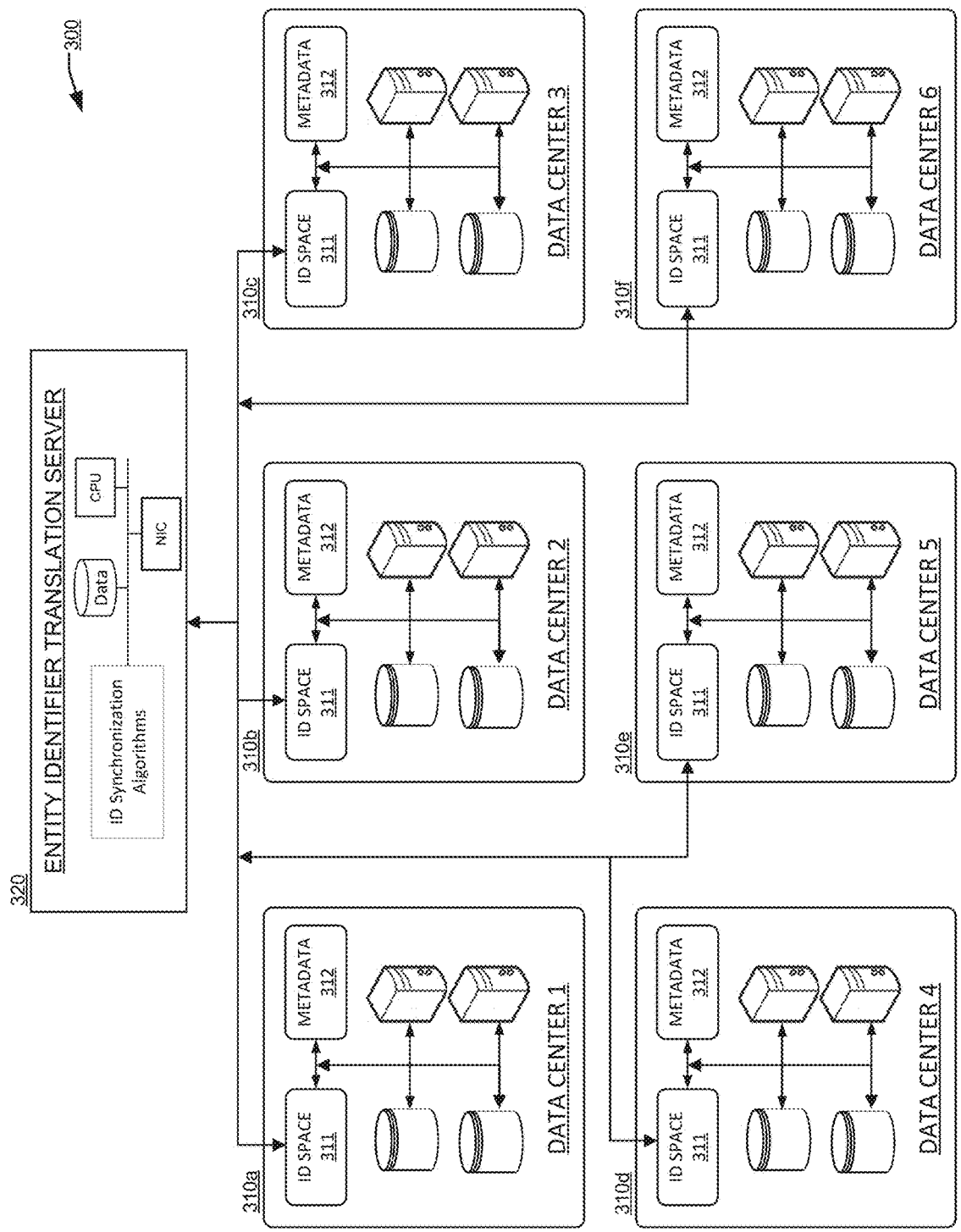
FIG. 3 is a block diagram illustrating a distributed environment including several data centers and an entity identifier translation server, in accordance with some embodiments.

With reference now to FIG. 3, a block diagram is shown illustrating a distributed environment 300 including several data centers 310a-310f, and an entity identifier translation server 320 configured to communicate with each of the data centers 310. In some embodiments, the entity identifier translation server 320 is also configured as a data center 310. The data centers 310 in this example may be separated geographically and/or with respect to hardware or network infrastructures. Different data centers may be associated with different functionality and/or different organizational entities. For example, a first data center 310a may be a data logics domain, a second data center 310b may be a BlueKai domain, a third data center 310c may be a Crosswire domain, and the system also may have entity identifiers in other spaces like Google, Facebook, etc. Nonetheless, the different data centers 310 may store related data, for example, by receiving and serving requests from the same sets of users, same devices, same browsers, etc.

As shown in this example, each data center 310 may include an ID space 311 configured to store data structures including entity identifier data and metadata 312 associated with the entity identifiers. In some embodiments, the ID spaces 311 may include storage structures for storing links between entity identifiers. Such links may be stored in a large-scale and low-latency database management system capable of operating across multiple data centers 310, such as an APACHE CASSANDRA database, which may be capable of handling hundreds of billions of entity identifiers.

In some embodiments, in each of the data centers 310 (or domains), and in each of these ID spaces 311, each entity identifier may be associated with various different metadata 312, such as browsing activity, application usage, IP address, browser type, etc. Those pieces of the metadata may enrich information available to the system in relation to particular entity identifiers.

In the ID spaces 311 of different data centers, different metadata may be collected. Thus, metadata from a first ID space and identified at a first data center may be unrepresented (despite being potentially informative) in a second ID space associated with a second data center. Accordingly, linking the ID spaces can increase information accessible at a data center.

Additionally, in certain use cases, a client may be performing an analysis in the address entity identifier space, but wants to deploy a communication protocol to a device population from the BlueKai entity identifier space. So, the entity identifier translation server 320 can convert one, more or all entity identifiers in one data center 310 from the address space 310a to the BlueKai space 310b. In some instances, a select subset of entity identifiers is identified for identifier mapping based on (for example) a quantity of metadata available in associated data structures and/or types of metadata available in associated data structures.

Each data center 310 may communicate with the entity identifier translation server 320 and/or with the other data centers 310. As discussed in more detail below, the entity identifier translation server 320 may include one or more ID synchronization algorithms which, when executed, may perform determinations regarding if and when particular entity identifiers are to be synchronized across data centers 310. Although the entity identifier translation server 320 is shown in this example as a separate system, in other examples, it may be implemented via software services executing on one or more of the data centers 310.

The distributed environment 300 in this example may correspond to a high-level computer architecture that provides Internet-based services and/or content to various client devices. The web-based resources available to client devices may be provided as web sites, web services, and/or more complex computing infrastructure instances which may include, for example, eCommerce systems, enterprise resource planning (ERP) systems, document management systems, customer relationship management (CRM) systems, and the like. Thus, web-based computing infrastructure within the application web servers and data storage components 310 may be built and maintained by various entities to provide Internet-based services to users such as customers, employees, students, or other organization members.

The computing environment 300 shown in FIG. 3 may be implemented as a cloud-based multi-tier system in this example, in which client devices may request and receive access to the Internet-based services within web servers which may be deployed and executed upon an underlying set of resources (e.g., cloud-based, SaaS, IaaS, PaaS, DaaS, etc.) including various hardware and/or software resources. Additionally, although cloud-based systems may be used in some embodiments, systems 300 in other examples may use on-premise data centers 310, server farms, distributing computing systems, and other various non-cloud computing architectures. Although the various additional hardware, software, and network components are not shown in FIG. 3 so as not to obscure the other components shown in the figure, it will be understood that any of the hardware, software, and/or network infrastructure components described herein may be incorporated into computing environment 300.

The various data centers 310 and the entity identifier translation server 320 in this example may include various hardware and/or software components (e.g., application programming interfaces (APIs), cloud resource managers, web caches, network components, etc.)(not shown in this example), to provide and monitor the access to the data centers 310, as well as to build and manage the underlying storage and resource usage within the data centers 310. The underlying resources of the data centers 310 may include, for example, a set of non-volatile computer memory devices implemented as databases, file-based storage, etc., a set of network hardware and software components (e.g., routers, firewalls, gateways, load balancers, etc.), a set of host servers, and various software resources such as, store software images, installations, builds, templates, configuration files, and the like, corresponding to different versions of various platform, server, middleware, and application software.

The data centers 310 also may include additional resources such as hypervisors, host operating systems, resource managers and other cloud-based applications, along with the hardware and software infrastructure to support various Internet-based services, such as Infrastructure as a Service (IaaS), Platform as a Service (PaaS), and Software as a Service (SaaS). Additionally, the underlying hardware of the data centers 310 and the entity identifier translation server 320 may be configured to support a number of internal shared services, which may include, for example, security and identity services, integration services, repository services, virus scanning services, backup and recovery services, notification services, file transfer services, and the like.

As noted above, many different types of computer architectures (cloud-based, web-based, hosting, multi-tier computing environments, distributed computing environments, etc.) may be capable and consistent with the features and embodiments of synchronizing entity identifiers described herein. However, in certain implementations, cloud computing platforms may be used to provide certain advantageous features for data generation and management. For example, cloud computing platforms may provide elasticity and scalability to quickly provision, configure, and deploy many different types of computing infrastructure instances, in contrast to non-cloud based implementations having fixed architectures and limited hardware resources. Moreover, public cloud, private cloud, and public-private hybrid cloud platforms may be used in various embodiments to leverage the features and advantages of each distinct architecture.

Figure 4:
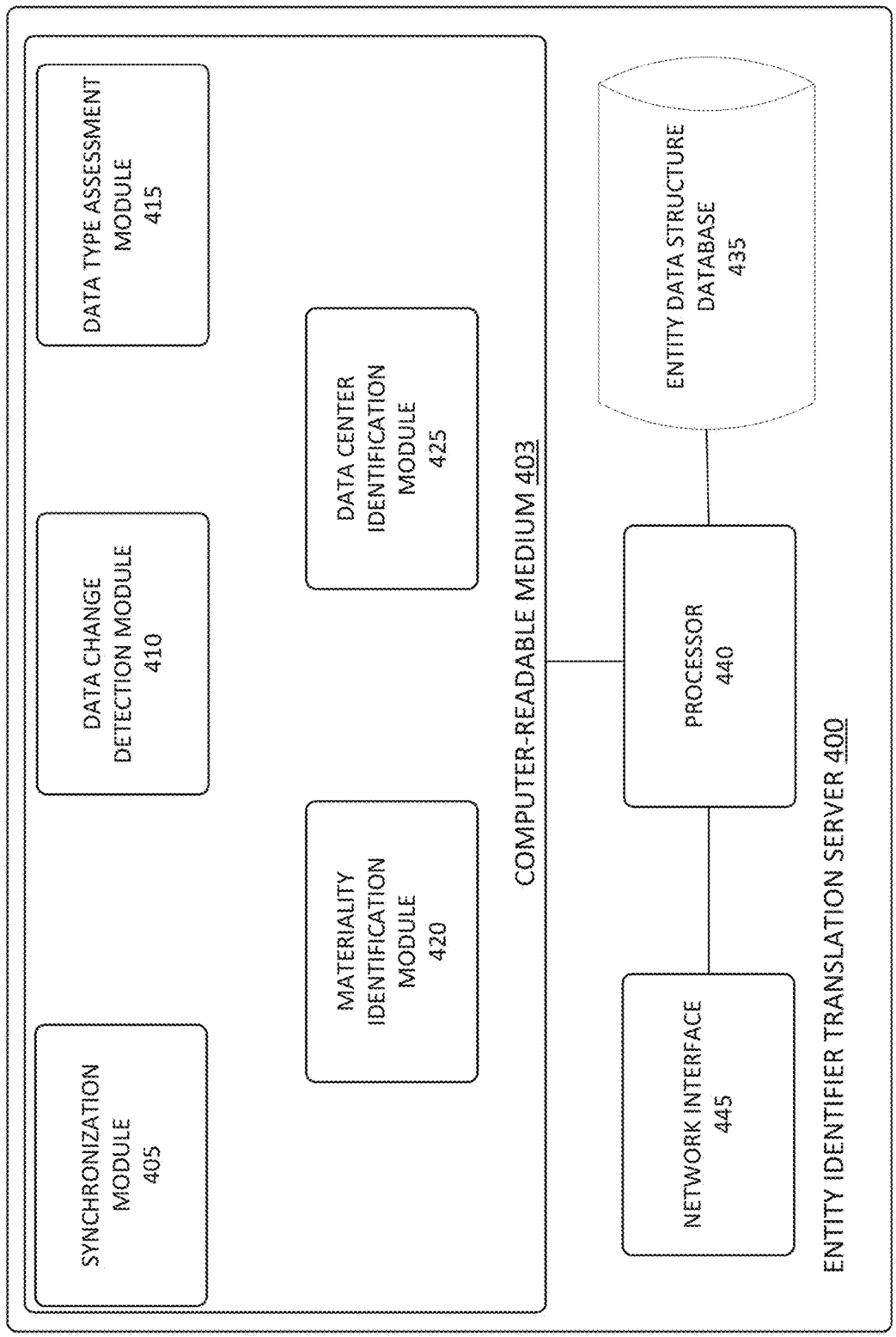
FIG. 4 is a block diagram illustrating an entity identifier translation server, in accordance with some embodiments.

FIG. 4 illustrates a block diagram of an entity identifier translation server 400 in greater detail. Entity identifier translation server 400 may be used to implement entity identifier translation server 320 and/or data centers 310 of FIG. 3, in some embodiments. Entity identifier translation server 400 may be implemented with any of the computing devices or servers described herein. Thus, entity identifier translation server 400 can be included in a data center. In some instances, entity identifier translation server 400 is separate from each of a set of data centers but nonetheless operates to promote synchronization between at least some of the set of data center. Entity identifier translation server 400 may include a processor 440 coupled to a computer readable medium 403 and a network interface 445. Entity identifier translation server 400 may also include or otherwise have access to a data structure database 435 that may be internal or external to entity identifier translation server 400.

Processor 440 may include one or more microprocessors to execute program components for performing the synchronization functions of entity identifier translation server 400. Network interface 445 can be configured to connect to one or more communication networks to allow entity identifier translation server 400 to communicate with other entities such as the data centers. Computer readable medium 403 may include any combination of one or more volatile and/or non-volatile memories, for example, RAM, DRAM, SRAM, ROM, flash, or any other suitable memory components. Computer readable medium 403 may store code executable by the processor 440 for implementing some or all of the synchronization functions of entity identifier translation server 400. For example, computer readable medium 403 may include code implementing a synchronization module 405, a data change detection module 410, a data type assessment module 415, a materiality identification module 420, and a data center identification module 425.

The data change detection module 410 may, in conjunction with processor 440, detect data changes at connected data centers. The data change detection module 410 may detect the data changes by any suitable method. For example, data centers may, in real time or at particular intervals, transmit a communication reporting data changes to the data change detection module 410. In another example, the data change detection module 410 may query data centers for data changes. In still another example, the data change detection module 410 may crawl and/or scrape the data centers to determine whether data changes have occurred. In some embodiments, these changes may be saved to data structure database 435.

The data type assessment module 415 may, in conjunction with processor 440, assess a type of data added or changed as a result of the data change. The type of data added or changed may include the entity identifier itself, new links between entity identifiers, modified links between entity identifier, terminated links between entity identifiers, new or modified metrics related to an entity identifier, changes to or additions of metadata associated with the entity identifier, and/or the like. The data type assessment module 415 may pass the identified type of data to the materiality identification module 420.

The materiality identification module 420 may, in conjunction with processor 440, identify, based on the assessment made by the data type assessment module 415, a subset of the data changes detected by the data change detection module 410 as having had a material change. The materiality of the change may be assessed based on any of a number of factors. For example, the materiality of the change may be based on whether the corresponding entity identifier has been used across multiple or certain data centers, whether the corresponding entity identifier is frequently used, whether the corresponding entity identifier is linked to an entity identifier that is frequently used, whether the corresponding entity identifier is related to a threshold amount of metadata, whether the corresponding entity identifier is related to valuable metadata, etc. In some embodiments, the data change may only be saved to the data structure database 435 if it is identified as material.

The data center identification module 425 may, in conjunction with processor 440, identify at least one data center (other than the data center that initiated the data change) from a set of data centers connected to and/or networked with the entity identifier translation server 400. The at least one data center may be subscribed to receive synchronization updates corresponding to the entity identifier. In some embodiments, the at least one data center may subscribe to receive synchronization updates corresponding to valuable entity identifiers so that the data structures in the data centers are up-to-date. Valuable entity identifiers may be those that are frequently used or linked to those that are frequently used, that frequently access the data center or are linked to those that frequently access the data center, that have a large amount of metadata, etc.

The synchronization module 405 may, in conjunction with processor 440, generate a communication representing the data change. The synchronization module 405 may further, in conjunction with processor 440 and network interface 445, transmit the communication to the at least one data center identified by the data center identification module 425. By transmitting the communication representing the data change to the at least one data center, the synchronization module 405 may facilitate synchronizing the modified or added data structure stored at the data center with a corresponding data structure stored at the at least one other data center.

Figure 5:
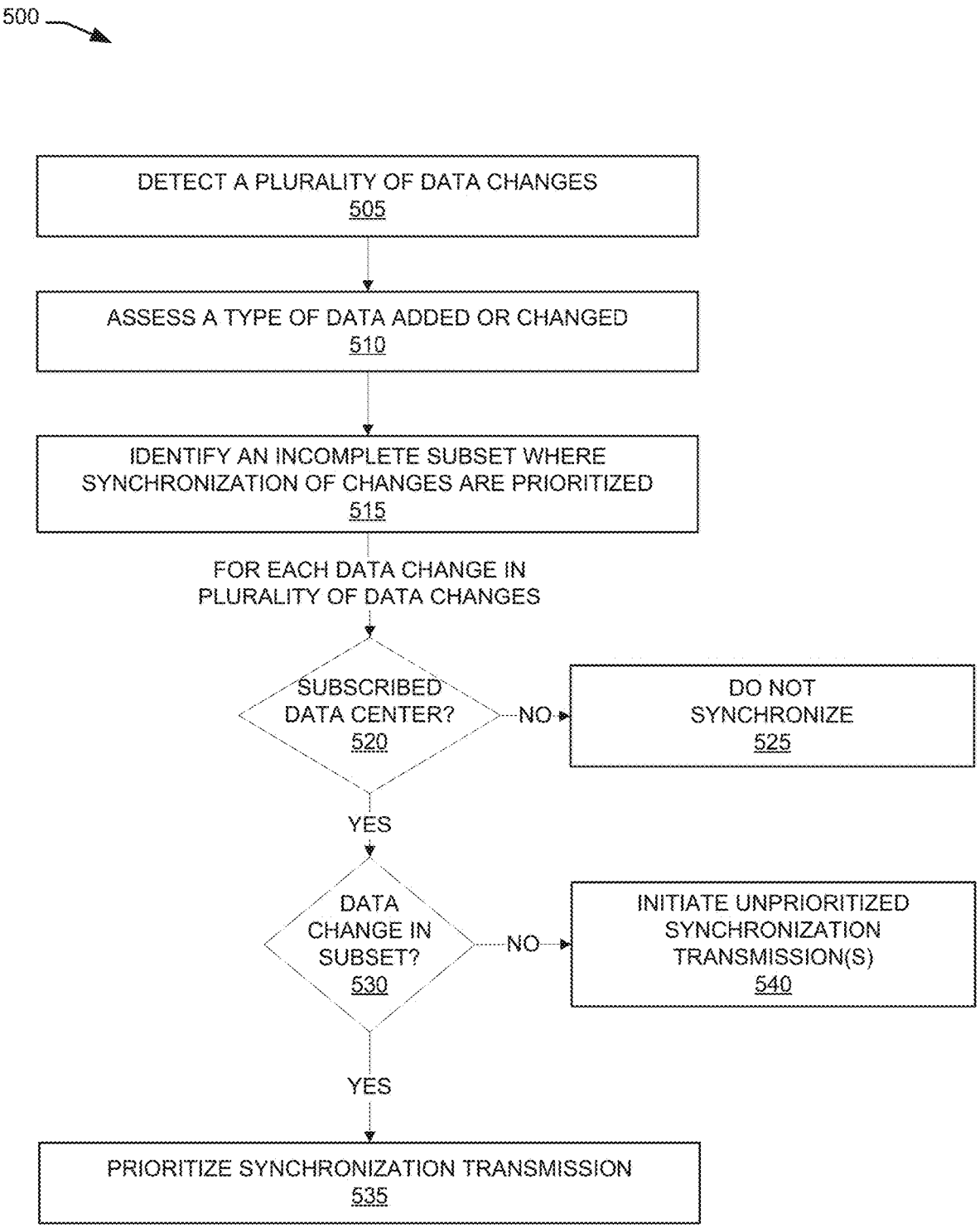
FIG. 5 is a flowchart illustrating a method for synchronizing entity identifiers across data centers, in accordance with some embodiments.

FIG. 5 is a flowchart 500 of a method for synchronizing entity identifiers across data centers, according to some embodiments. The method may be performed by the entity identifier translation server 400 of FIG. 4, for example.

At block 505, a plurality of data changes may be detected. Each data change of the plurality of data changes may have occurred at a particular data center. Each data change of one or more of the plurality of data changes may have been made in response to (for example) receiving a communication from a web server or client device. The change may (for example) add content that was included in the communication or add content that is representative of a type or characteristic of the communication.

In some embodiments, the data changes may correspond to a modification of a data structure in the data center. In some embodiments, the data changes may correspond to an addition of a data structure in the data center. The data structure may include any data including or associated with an entity identifier. For example, the data structure may include the entity identifier itself, links between entity identifiers, metrics related to the entity identifier, and/or metadata associated with an entity identifier. The metadata may represent an existence of or characteristic of one or more previous communications transmitted from a computer system associated with the entity identifier. For example, the metadata may reflect a client device's access to a particular Internet Protocol (IP) address over time.

At block 510, a type of data added or changed as a result of the data change may be assessed for each data change of the plurality of data changes. In some embodiments, a quantity of data fields affected by the data change may be identified. In some embodiments, a materiality metric based on the type of data changed or added may be identified for each data change of the plurality of data changes. The type of data added or changed may include the entity identifier itself, new links between entity identifiers, modified links between entity identifier, terminated links between entity identifiers, new or modified metrics related to an entity identifier, changes to or additions of metadata associated with the entity identifier, and/or the like.

At block 515, an incomplete subset of the plurality of data changes may be identified. Each data change of the incomplete subset can be identified as a prioritized data change. For example, the identification can include determining that each data change within the incomplete subset corresponds to a material change. The identification of the incomplete subset may depend on the assessment performed at block 510. In some instances, each data change in the incomplete subset is to be positioned in an advanced position of a synchronization queue, to have synchronization performed in non-batch mode, and/or is to be have synchronization performed immediately or nearly immediately, whereas data changes not in the incomplete subset may be configured to be positioned at an end of a synchronization queue, to have synchronization performed in batch mode, and/or to not have synchronization performed immediately or nearly immediately.

The identification may be performed using (for example) a look-up table, score generation technique and/or threshold comparison. For example, block 515 can include determining, for each of the plurality of data changes, whether the change corresponded to one or more prioritized data fields (e.g., as indicated in a look-up table) and/or to one or more prioritized data structures (e.g., as indicated in a look-up table). As another example, block 515 can include generating, for each of the plurality of data changes, a score for the data change. The score may be defined to be a weighted sum, where each addend corresponds to a data field that was changed or added and each weight corresponds to a prioritization of the data field. The score can be used to rank changes relative to each other or to assess relative to a prioritization threshold. As yet another example, block 515 can include comparing one or more metrics (e.g., a quantity of values added or changed, a quantity of total values in the corresponding changed data structure, a frequency at which the corresponding data structure is changed locally and/or in response to synchronization, a number of data centers subscribed to receive synchronization updates for the corresponding data structure, etc.) to an absolute threshold or relative threshold (e.g., to identify n data changes corresponding to n highest metrics).

Process 500 then performs proceeds to block 520 for each data change in the plurality of data changes. At block 520, for each data change in the incomplete subset of the plurality of data changes, it is determined at decision block 525 whether at least one other data center from a set of data centers is subscribed to receive synchronization updates corresponding to the data change (e.g., to receive updates corresponding to an identifier of or associated with a data structure changed or added by the data change). In some instances, the at least one other data center may be identified by querying the set of data centers with an identifier associated with the data change (e.g., an identifier of a data structure that was added or changed, an identifier of an entity associated with the data change, an identifier of a device from which a communication was received that triggered the data change, etc.).

In some instances, the at least one other data center may be identified via a look-up table. For example, a subscription-tracking data object that is stored and/or managed locally, remotely or both locally and remotely can identify current data-structure subscriptions. The subscription-tracking data object can (for example) identify, for each of a set of data structures, which (if any) data centers are subscribed to receive updates for the data structure. Thus, block 525 may include using an identifier associated with the update to look up which (if any) data centers are subscribed for updates.

In some instances, the at least one other data center may be identified by evaluating a rule. For example, a subscription-tracking data object can identify, for each of a set of data centers, one or more data-structure characteristics defining data structures for which updates are requested (e.g., indicating that an update is requested when an identifier corresponding to the updated data structure is included in the other data structure or that an update is requested when at least a threshold number of new or changed field values were identified in the update). Block 525 may then include determining whether data associated with the data change satisfies any subscription criterion (e.g., by determining whether the data change has one or more characteristics that match those in the subscription-tracking data object).

If no data centers are subscribed to receive updates for the data change, process 500 continues to block 525 where no synchronization action is performed for the given data change. Process 500 can then return to block 520 to assess a next data change in the plurality.

If at least one data center is subscribed to receive updates, process 500 proceeds to block 530 where it is determined whether the data change is in the incomplete subset identified at block 515. If the data change is in the subset, process 500 proceeds to block 535 where a synchronization transmission is prioritized. As one example, prioritizing the synchronization can include (for example) transmitting a synchronization communication immediately or nearly immediately (e.g., within 5, 10, 30 or 60 seconds from performing block 530). As another example, a queue item corresponding to performing the synchronization transmission for the data change can be added to a queue, where the queue item is assigned an advanced position within the queue (e.g., at a front of the queue or within a top prioritized part of the queue). The communication may specifically correspond to the data change, such that changes to various data structures may be transmitted independently and/or asynchronously from other synchronization communications. The communication may represent the data change and facilitate synchronizing the modified or added data structure stored at the data center with a corresponding data structure stored at the other data center. Process 500 can then return to block 520 to assess a next data change in the plurality of data changes.

If the data change is not included in the incomplete subset, process 500 proceeds to block 540 where unprioritized synchronization transmission is initiated. For example, queue item corresponding to performing the synchronization transmission for the data change can be added to a queue, where the queue item is not assigned an advanced position within the queue (e.g., and is instead positioned at an end of the queue or within a bottom unprioritized part of the queue). As another example, synchronization transmission for the data change may be paused until a scheduled time or until another condition is satisfied, as which point, the transmission may occur as part of a batch transmission to one or more data centers. Thus, the transmission may occur as part of a batch communication and/or synchronized communications. The communication may represent the data change and facilitate synchronizing the modified or added data structure stored at the data center with a corresponding data structure stored at the other data center. Process 500 can then return to block 520 to assess a next data change in the plurality of data changes.

It will be appreciated that variations of process 500 are contemplated. For example, a determination at block 530 that a change is not in the subset may result in not performing a synchronization action for the data change. As another example, a three-level prioritization scheme is used (e.g., thereby defining up to three subset criteria), where inclusion in a first level results in prioritized synchronization transmission, inclusion in a second level results in initiating unprioritized synchronization transmission, and inclusion in a third level results in not performing a synchronization level. As yet another example, a continuous prioritization scheme is used in lieu of a stepwise prioritization scheme. Each data change may be assigned a prioritization score, which may be used to identify a position within a synchronization queue for the data change.

Figure 6:
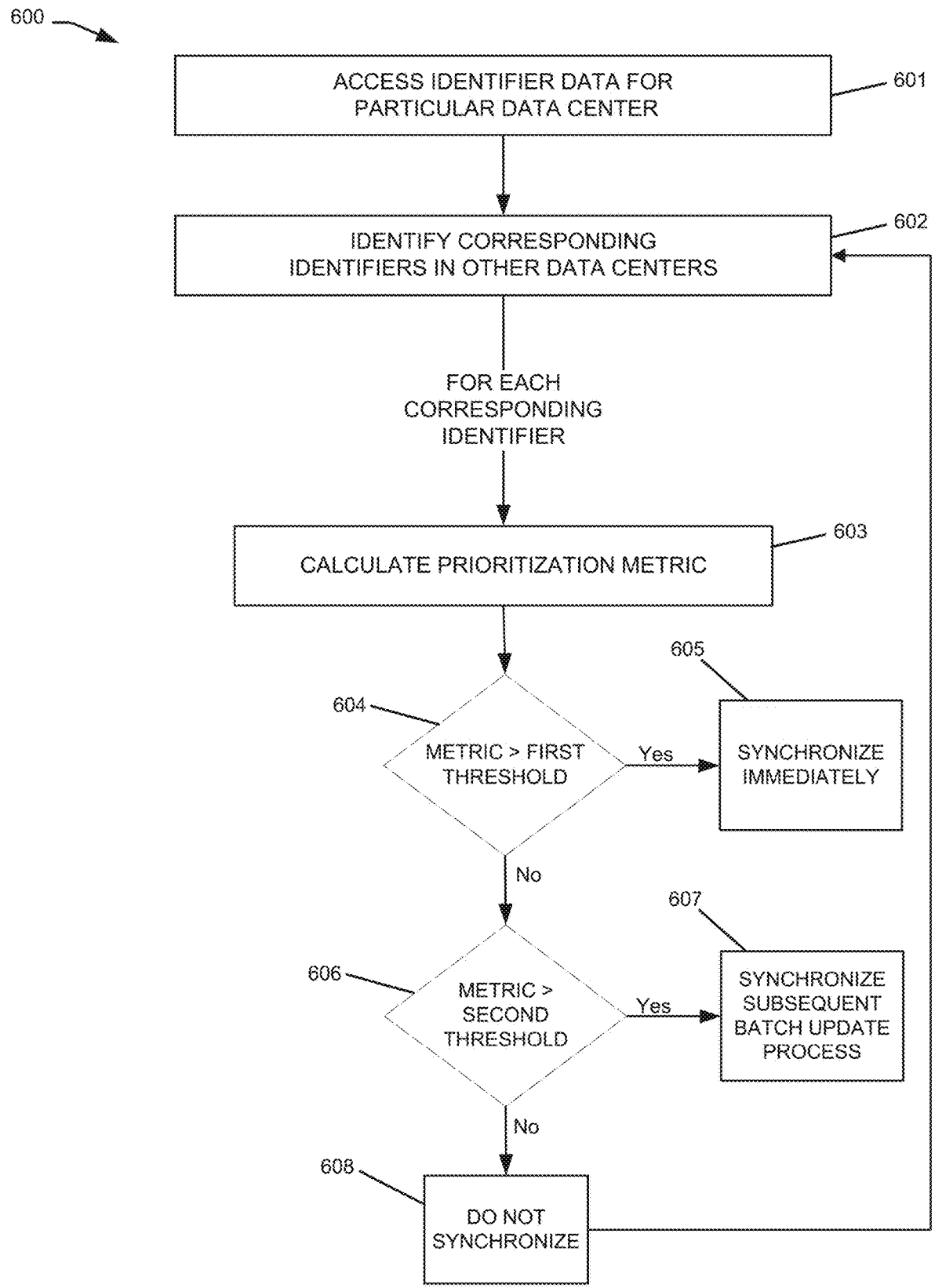
FIG. 6 is a flowchart illustrating a method for determining whether to synchronize entity identifiers across data centers, in accordance with some embodiments.

Referring now to FIG. 6, a flow diagram 600 is shown illustrating an example method of synchronizing entity identifiers across multiple data centers (e.g., 310a-310f), based on determinations by an entity identifier translation server 320 of prioritization metrics. Part or all of process 600 may be performed by one or more components in the entity identifier translation server 320, such as the identifier synchronization algorithms and associated software components. However, it will be understood that process actions such as detecting changes to entity identifiers within data centers, identifying corresponding entity identifiers, and determining if and when the corresponding entity identifiers are to be synchronized, need not be limited to the specific systems and hardware implementations described above, but may be performed within other computing environments comprising other combinations of the hardware and software components described herein.

At block 601, identifier data corresponding to a particular data center can be accessed. In some instances, block 601 can include accessing, at the particular data center, locally stored identifier data. In some instances, block 601 can include accessing identifier corresponding to remote data changes, For example, the accessing may be performed at a translation service that operates as a separate process which runs outside of data centers and/or the other cloud components, and which performs the synchronization by updating the ID spaces continuously or periodically.

The identifier data can include one or more identifiers, each of which can be associated with a recent data change to a data structure. Each identifier in the identifier data can be configured within an ID space for the particular data center. Each of the one or more identifiers may include an identifier associated with (for example) a particular data structure, particular client device (e.g., mobile device), particular individual user, particular IP address, particular browser, particular email address (or hashes of email addresses to protect user privacy) and/or particular household. The identifier data may have been collected based on the characteristics of interactions with external clients (e.g., client devices requesting or updating data within the data center), during which the characteristics of the ID data may be collected by data center software and/or scripts running on accessed web pages or other resources.

In some embodiments, the identifier data received may correspond to particular identifiers associated with data structure that have recently been changed (e.g., newly created, updated, or deleted) within the particular data center. For each of the one or more identifiers, the identifier may have been detected within or otherwise associated with the changed data structure. In some instances, process 600 is performed in response to detecting any data change. In some instances, process 600 is performed (for example) at predefined times, in response to detecting a predefined number of data changes and/or upon detecting that a length of a synchronization queue has exceed (or dropped below) a predefined threshold.

At block 602, corresponding (or linked) identifiers in one or more of the other data centers may be identified. In various examples, corresponding identifiers may exist in each of the other data centers, some of the other data centers, or none of the other data centers (in which case the process may end). In some instances, an identifier in the identifier data is the same as a corresponding identifier in another data center. In some instances, an identifier in the identifier data is different than a corresponding identifier in another data center but is linked (e.g., as a result of another shared identifier, matching algorithm, user input, etc.).

Blocks 603-608 may then be performed for each of the corresponding identifiers existing in other data centers. At block 603, a prioritization metric can be calculated for the corresponding identifier. The prioritization metric may represent a materiality for a function performed at the other data center (e.g., content distribution, webpage interaction, etc.). The prioritization metric may be calculated based on (for example) determinations relating to the affinity for the corresponding identifier in the other data center, such as, whether the corresponding identifier has been used within the other data center, whether the corresponding identifier is related to other identifiers within the other data center that are frequently used, whether the corresponding identifier is related to a threshold amount of metadata, whether the corresponding identifier is related to one or more predetermined items of valuable metadata, etc. Answers in the affirmative to one or more of the questions may indicate that the corresponding identifier is to be associated with a high prioritization metric with respect to the other data center.

In some cases, an algorithm and/or numerical calculation in step 403 may calculate the prioritization metric based on the number of these factors present for the corresponding entity identifier and the magnitude of the factor (e.g., the amount of use of the corresponding identifier, the number and frequency of use of related identifiers, the amount of associated metadata and/or number of valuable associated metadata, etc.). A contrasting analysis may determine whether the corresponding identifier in the other data center is a new and/or unused identifier, whether it is not linked to many (or any) other entity identifiers, etc. These additional factors may indicate a low importance value for the corresponding identifier in the other data center (e.g., resulting in a lower prioritization metric).

In some cases, block 603 may include a numerical calculation of a prioritization metric, while in other cases one or more Boolean determinations (e.g., sufficiently material or not) may be performed based on the factors above.

Additionally or alternatively, in other examples, one or more of the following factors may be determined to increase the priority of synchronizing a profile. As one example, a high frequency of accessing, viewing and/or using a data structure may increase a prioritization metric that corresponds to the data structure. As another example, a high number of categories associated with a data structure may increase a prioritization metric that corresponds to the data structure.

In contrast, in the same or additional examples, one or more of the following factors may be determined to decrease the priority of synchronizing a profile. As one example, a data structure with little data (and/or data for few fields) may decrease a prioritization metric that corresponds to the data structure. The reduced data-structure data may be indicative of corresponding to a bot or from a browser that doesn't allow setting of third-party cookies, such that synchronizing such data structures may result in resource consumption without providing meaningful entity characterizations. As another example, if a 'fresh' synchronization has been received recently for the data structure, a prioritization metric that corresponds to the data structure may be decreased (e.g., as other data centers may already have access to the updated data). As yet another example, a prioritization metric may depend on a country associated with the data structure. Each country may be associated with a weight in a look-up table, which can influence the prioritization metric.

In still other examples, heuristics may be applied relating to how often a particular identifier that is linked to identifiers in other spaces is used in a particular domain, or the value of a cookie or an identifier. By embedding the right heuristics and the right decision making logic into a synchronization layer within the data centers and/or translation service, the data center may effectively route the correct (e.g., high-value) identifiers, and the correct updates to the correct data centers at appropriate times. In some embodiments, organizational processes may dictate that not all data structures are of the same value, and also different data structures may be valued differently in different data centers. Thus, rules may be applied based on the value of different data structures within different data centers. Additional rules and qualifiers may go into the decision making process that determines for which data structures synchronization is to be prioritized (e.g., performed quickly or immediately), because there is a tangible benefit to synchronization (and/or a cost for not synchronizing). Synchronization for other data structures may be performed later (e.g., in a more batch oriented update process) or not at all.

In step 604, the prioritization metric calculated in step 603 may be compared to a first predefined threshold. If the metric exceeds the first threshold (604:Yes), then in step 605 synchronization for the data change can be immediately initiated. For example, a synchronization communication identifying the data change may be transmitted (e.g., immediately, in real-time or nearly immediately) to synchronize the data structures across the particular data center and other data center. The real-time synchronization may be initiated by a translation service or by the particular data center itself, and may be performed via low latency network connections between the ID spaces of the different data centers. For example, a synchronization triggered by a change in the links/relationships of an identifier may include transmitting the links/relationships from the particular data center on which the entity identifier was updated to one or more of the additional data centers.

If the prioritization metric does not exceed the first threshold (604:No), then it may be compared to a second (lower) threshold in block 606. If the prioritization metric exceeds the second threshold (606:Yes), then in block 607 a synchronization for the data change can be configured to be performed at a later time. The delayed synchronization may be performed using a batch process, such that synchronization of one or more other data structures are performed at the same time and/or via a same transmission. Such batch processes will not perform the synchronization as quickly, but are also less costly then the immediate synchronization performed in block 605. Thus, periodic batch processes may be appropriate for synchronizing data structure that are not the most valuable or material (which are to be done immediately), but are in a middle tier of value or materiality.

If the prioritization metric is below the second threshold (606:No), then at block 608, the data structure need not be synchronized. In such cases, it may have determined that the corresponding entity identifiers either do not exist or are mostly (or completely) immaterial within the other data centers, and thus the benefit to the distributed system in synchronizing does not justify the cost even of batch process synchronizing.

As noted above, the prioritizations discussed in steps 603-608 might depend on destination data center 310 as well as the identifier associated with the data change, and thus the identifier-destination pair may be used in the calculations/determinations in these steps. For example, after an identifier is updated in one data center, one possible destination may be a BlueKai data center 310b and another possible destination may be a Crosswise data center 310c. In this example, the BlueKai data center 310b may have a general and relatively high-value infrastructure and a central routing hub, and thus it is very likely that many/most identifiers are to be synchronized to that BlueKai data center 310b almost all the time. In this example, the Crosswise data center 310c on the other hand may have a very specific subset of interests, and thus that data center 310c might prioritize certain identifiers that are relevant to those specific use cases. Corresponding routing logic to implement these rules and preferences may be embedded into the entity identifier translation server 320, to better determine which identifiers are to be synchronized in which destinations and at which times.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method comprising:
   detecting a plurality of data changes at a first data center of a plurality of data centers, each data change of the plurality of data changes corresponding to a modification to an existing data structure or an addition of a new data structure in the first data center, wherein the existing data structure or the new data structure are associated with a first entity identifier, and wherein the existing data structure or the new data structure includes metadata that indicates a characteristic of one or more previous communications transmitted from a computer system associated with the first entity identifier; and
   for each data change of the plurality of data changes:
      determining a type of data being modified or added as a result of the data change;
      identifying one or more second entity identifiers that are associated with the first entity identifier, each second entity identifier of the one or more second entity identifiers being associated with a data structure in a different data center of a plurality of data centers from the first data center;
      for each second entity identifier of the one or more second entity identifiers:
         generating a priority metric for the data change that is based on the type of data and the second entity identifier;
         determining that the priority metric for the data change exceeds a threshold value; and
         transmitting, in response determining that the priority metric for the data change exceeds the threshold value and to the different data center of the plurality of data centers, a priority communication representing the data change to facilitate synchronizing the modification to the existing data structure stored at the first data center with a corresponding data structure stored at the different data center or storage of the new data structure at the different data center;
      defining a set of data changes from the plurality of data changes that includes data changes having at least one second entity identifier in which a priority communication was not transmitted;
      for each data change in the set of data changes:
         identifying at least one other data center from the plurality of data centers that is subscribed to receive synchronization updates corresponding to the first entity identifier; and transmitting, to each of the at least one other data center, a non-priority communication representing the data change to facilitate synchronizing the modification to the existing data structure stored at the first data center with a corresponding data structure stored at the other data center.

2. The computer-implemented method of claim 1, wherein, determining the type of data being modified or added as a result of the data change further includes identifying a quantity of data fields affected by the data change, and wherein generating a priority metric for the data change that is based on the type of data and the second entity identifier includes determining that the quantity of data fields affected by the data change exceeds a predefined threshold.

3. The computer-implemented method of claim 1, wherein determining the type of data being modified or added as a result of the data change further includes identifying a prioritization metric based on the type of data changed or added.

4. The computer-implemented method of claim 3, wherein the generating a priority metric is further based on a user level that corresponds to a user associated with the data change.

5. The computer-implemented method of claim 1, wherein, for each data change in the set of data changes, the non-priority communication is transmitted after each priority communication.

6. The computer-implemented method of claim 1, wherein the non-priority communications for the data changes in the set of data changes are transmitted in a batch process.

7. The computer-implemented method of claim 1, wherein the different data center is identified by querying the plurality of data centers with the first entity identifier.

8. A computer-program product tangibly embodied in a non-transitory machine-readable storage medium of a host device, including instructions that, when executed by one or more processors, cause the one or more processors to:

detect a plurality of data changes at first data center of a plurality of data centers, each data change of the plurality of data changes corresponding to a modification to an existing data structure or addition of a new data structure in the first data center, wherein the existing data structure or the new data structure are associated with a first entity identifier, and wherein the existing data structure or the new data structure includes metadata that indicates a or characteristic of one or more previous communications transmitted from a computer system associated with the first entity identifier; and for each data change of the plurality of data changes:
  determine a type of data being modified or added as a result of the data change;
  identify one or more second entity identifiers that are associated with the first entity identifier, each second entity identifier of the one or more second entity identifiers being associated with a data structure in a different data center of the plurality of data centers from the first data center;
  for each second entity identifier of the one or more second entity identifiers:
    generate a priority metric for the data change that is based on the type of data and the second entity identifier;

determining that the priority metric for the data change exceeds a threshold value; and transmit, in response determining that the priority metric for the data change exceeds the threshold value and to the different data center of the plurality of data centers, a priority communication representing the data change to facilitate synchronizing the modification to the existing data structure stored at the first data center with a corresponding data structure stored at the different data center or storage of the new data structure at the different data center;

idefining a set of data changes from the plurality of data changes that includes data changes having at least one second entity identifier in which a priority communication was not transmitted;

for each data change in the set of data changes:
  identifying at least one other data center from the plurality of data centers that is subscribed to receive synchronization updates corresponding to the first entity identifier; and
  transmitting, to each of the at least one other data center, a non-priority communication representing the data change to facilitate synchronizing the modification to the existing data structure stored at the first data center with a corresponding data structure stored at the other data center.

9. The computer-program product of claim 8, wherein determining the type of data being modified or added as a result of the data change further includes identifying a quantity of data fields affected by the data change, and wherein generating a priority metric for the data change that is based on the type of data and the second entity identifier includes determining that the quantity of data fields affected by the data change exceeds a predefined threshold.

10. The computer-program product of claim 8, wherein determining the type of data being modified or added as a result of the data change further includes identifying, for each data change of the plurality of data changes, a prioritization metric based on the type of data changed or added.

11. The computer-program product of claim 10, wherein generating a priority metric is further based on a user level that corresponds to a user associated with the data change.

12. The computer-program product of claim 8, wherein, for each data change in the set of data changes, the non-priority communication is transmitted after each priority communication.

13. The computer-program product of claim 8, wherein the non-priority communications for the data changes in the set of data changes are transmitted in a batch process.

14. The computer-program product of claim 8, wherein the different data center is identified by querying the plurality of data centers with the first entity identifier.

15. A device comprising:
one or more processors; and
a non-transitory computer-readable medium containing instructions that, when executed by the one or more processors, cause the one or more processors to perform operations including:
  detecting a plurality of data changes at a first data center of a plurality of data centers, each data change of the plurality of data changes and corresponding to a modification to an existing data structure or an addition of a new data structure in the first data center, wherein the existing data structure or the new data structure are associated with a first entity identifier, and wherein the existing data structure or the new data structure includes metadata that indicates a characteristic of one or more previous communications transmitted from a computer system associated with the first entity identifier; and for each data change of the plurality of data changes:
  determining a type of data being modified or added as a result of the data change;
  identifying one or more second entity identifiers that are associated with the first entity identifier, each second entity identifier of the one or more second entity identifiers being associated with a data structure in a different data center of the plurality of data centers from the first data center;
  for each second entity identifier of the one or more second entity identifiers:
    generating a priority metric for the data change that is based on the type of data and the second entity identifier;
    determining that the priority metric for the data change exceeds a threshold value; and
    transmitting, in response determining that the priority metric for the data change exceeds the threshold value and to the different data center of the plurality of data centers, a priority communication representing the data change to facilitate synchronizing the modification to the existing data structure stored at the first data center with a corresponding data structure stored at the different data center or storage of the new data structure at the different data center;
  defining a set of data changes from the plurality of data changes that includes data changes having at least one second entity identifier in which a priority communication was not transmitted;
  for each data change in the set of data changes:
    identifying at least one other data center from the plurality of data centers that is subscribed to receive synchronization updates corresponding to the first entity identifier; and
    transmitting, to each of the at least one other data center, a non-priority communication representing the data change to facilitate synchronizing the modification to the existing data structure stored at the first data center with a corresponding data structure stored at the other data center.

16. The device of claim 15, wherein determining the type of data being modified or added as a result of the data change further includes identifying a quantity of data fields affected by the data change, and wherein generating a priority metric for the data change that is based on the type of data and the second entity identifier includes determining that the quantity of data fields affected by the data change exceeds a predefined threshold.

17. The device of claim 15, wherein determining the type of data being modified or added as a result of the data change further includes identifying a prioritization metric based on the type of data changed or added.

18. The device of claim 17, wherein generating a priority metric is further based on a user level that corresponds to a user associated with the data change.

19. The device of claim 15, wherein,
  for each data change in the set of data changes, the non-priority communication is transmitted after each priority communication is transmitted.

20. The device of claim 15, wherein the non-priority communications for the data changes in the set of data changes are transmitted in a batch process.

* * * * *

UNITED STATES PATENT AND TRADEMARK OFFICE
CERTIFICATE OF CORRECTION

PATENT NO. : 11,113,307 B2  
APPLICATION NO. : 15/934810  
DATED : September 7, 2021  
INVENTOR(S) : Abrams Page 1 of 1

It is certified that error appears in the above-identified patent and that said Letters Patent is hereby corrected as shown below:

In the Specification

In Column 20, Line 12, delete "changes," and insert -- changes. --, therefor.

In the Claims

In Column 24, Line 51, in Claim 1, after "response" insert -- to --.

In Column 25, Line 50, in Claim 8, delete "a or" and insert -- a --, therefor.

In Column 26, Line 3, in Claim 8, after "response" insert -- to --.

In Column 26, Line 13, in Claim 8, delete "idefining" and insert -- defining --, therefor.

In Column 27, Line 20, in Claim 15, after "response" insert -- to --.

In Column 28, Line 30, in Claim 19, delete "communication is transmitted." and insert -- communication. --, therefor.

Signed and Sealed this  
Fifteenth Day of February, 2022

Drew Hirshfeld  
*Performing the Functions and Duties of the*  
*Under Secretary of Commerce for Intellectual Property and*  
*Director of the United States Patent and Trademark Office*